US012800106B2

(12) United States Patent
Ghiotto

(10) Patent No.: US 12,800,106 B2
(45) **Date of Patent: *Nov. 17, 2026**

(54) NITROX-MIXTURES PRODUCTION MACHINE AND RELATED OPERATING METHOD

(71) Applicant: Nardi Compressori S.R.L., Montecchio Maggiore-VI (IT)

(72) Inventor: Marco Ghiotto, Montecchio Maggiore-VI (IT)

(73) Assignee: Nardi Compressori S.R.L., Montecchio Maggiore-VI (IT)

(*) Notice: Subject to any disclaimer, the term of this patent is extended or adjusted under 35 U.S.C. 154(b) by 124 days.

This patent is subject to a terminal disclaimer.

(21) Appl. No.: 18/605,885

(22) Filed: Mar. 15, 2024

(65) Prior Publication Data

US 2024/0309996 A1 Sep. 19, 2024

(30) Foreign Application Priority Data

Mar. 16, 2023 (IT) ........................ 102023000005010
Oct. 24, 2023 (IT) ........................ 102023000022266

(51) Int. Cl.
*F17C 5/00* (2006.01)
*B01D 63/00* (2006.01)
*F17C 5/06* (2006.01)

(52) U.S. Cl.
CPC ................ *F17C 5/007* (2013.01); *F17C 5/06* (2013.01); *B01D 63/00* (2013.01);
(Continued)

(58) Field of Classification Search
CPC ...... F17C 5/007; F17C 5/06; F17C 2221/031; F17C 2227/0157; F17C 2227/048;
(Continued)

(56) References Cited

U.S. PATENT DOCUMENTS 4,860,803 A * 8/1989 Wells ........................ F17C 5/06 128/204.22
4,877,056 A * 10/1989 Comte .................. F16K 47/045 137/884

(Continued)

FOREIGN PATENT DOCUMENTS

DE 102010003507 A1 * 10/2011 ............. B01D 53/22
DE 102014108874 12/2015

(Continued)

OTHER PUBLICATIONS

DE-102010003507-A1 English Translation of Specification (Year: 2025).*

(Continued)

*Primary Examiner* — Kenneth Rinehart
*Assistant Examiner* — Stephanie A Shrieves

(57) ABSTRACT

Nitrox-mixtures production machine having a molecular separator structured to receive at inlet a flow of air and to provide at outlet an intermediate Nitrox mixture with high oxygen percentage, a low-pressure compressor adapted to feed an airflow at inlet of the molecular separator, a mixing manifold configured to communicate with the molecular separator for receiving the intermediate Nitrox mixture and structured to mix the intermediate Nitrox mixture with fresh air coming from the outside, oxygen sensor, adapted to measure the oxygen percentage present in the final Nitrox mixture; pressure sensor, adapted to measure the air pressure in the molecular separator, and an electronic control device adapted to regulate the flowrate of the airflow that is sucked in by the low-pressure compressor based on the signals coming from the oxygen sensor and the pressure sensor.

18 Claims, 4 Drawing Sheets

(52) U.S. Cl.
CPC .............................. *F17C 2221/031* (2013.01); *F17C 2227/0157* (2013.01); *F17C 2227/048* (2013.01); *F17C 2250/032* (2013.01); *F17C 2250/043* (2013.01); *F17C 2250/0452* (2013.01); *F17C 2250/0636* (2013.01); *F17C 2265/015* (2013.01); *F17C 2270/025* (2013.01); *F17C 2270/0781* (2013.01)

(58) Field of Classification Search
CPC .......... F17C 2250/032; F17C 2250/043; F17C 2250/0452; F17C 2250/0636; F17C 2265/015; F17C 2270/025; F17C 2270/0781; B01D 2053/0224; B01D 2256/12; B01D 2257/102; B01D 2311/103; B01D 2313/24; B01D 2313/903; B01D 53/22; B01D 63/02; C01B 21/04
USPC .............................................................. 141/37
See application file for complete search history.

(56) References Cited

U.S. PATENT DOCUMENTS

| | | | | |
|---|---|---|---|---|
| 5,053,058 | A * | 10/1991 | Mitariten | B01D 53/22 95/55 |
| 5,651,358 | A * | 7/1997 | Briend | A61M 16/12 128/204.22 |
| 5,846,291 | A * | 12/1998 | Delp, II | B63C 11/202 95/47 |
| 5,989,312 | A * | 11/1999 | Barnhard | G05D 23/1931 96/397 |
| 5,992,464 | A * | 11/1999 | Cowell | B01F 33/82 137/892 |
| 6,395,065 | B1 | 5/2002 | Murdoch et al. | |
| 6,792,846 | B2 | 9/2004 | Barrett | |
| 6,827,084 | B2 * | 12/2004 | Grubb, Jr. | B01F 35/833 128/204.22 |
| 6,904,913 | B2 * | 6/2005 | Aylsworth | A61M 16/101 128/204.22 |
| 11,009,186 | B2 * | 5/2021 | Sung | A62B 27/00 |
| 2003/0234019 | A1 | 12/2003 | Grubb, Jr. | |
| 2005/0066814 | A1 * | 3/2005 | Huebner | C01B 13/0251 96/4 |
| 2006/0230929 | A1 | 10/2006 | Bliss et al. | |
| 2011/0300493 | A1 * | 12/2011 | Mittricker | F23C 9/00 431/89 |
| 2015/0336046 | A1 | 11/2015 | Ungerank et al. | |
| 2016/0348620 | A1 | 12/2016 | Ramseyer et al. | |
| 2018/0094628 | A1 * | 4/2018 | Ghiotto | F04B 49/06 |
| 2021/0228254 | A1 | 7/2021 | Mayer et al. | |

FOREIGN PATENT DOCUMENTS

| | | |
|---|---|---|
| EP | 0851331 | 7/1998 |
| FR | 2722425 | 1/1996 |
| WO | WO 2022/029888 | 2/2022 |

OTHER PUBLICATIONS

Rapporto di Ricerca e Opinione Scritta [Search Report and Written Opinion] Dated Sep. 29, 2023 From the Ministero delle Imprese e del Made in Italy, Direzione Generale Sviluppo Produttivo e Competitivita, Ufficio Italiano Brevetti e Marchi Re. Application No. IT202300005010. (5 Pages).

European Search Report and the European Search Opinion Dated Jun. 19, 2024 From the European Patent Office Re. Application No. 24163490.6. (7 Pages).

Rapporto di Ricerca e l'Opinione Scritta [Search Report and Written Opinion] Dated Apr. 19, 2024 From the Ministero Delle Imprese e Del Made in Italy, Direzione Generale Sviluppo Produttivo e Competitivita, Ufficio Italiano Brevetti e Marchi Re. Application No. IT202300022266. (8 Pages).

Official Action Dated Jul. 16, 2025 from the US Patent and Trademark Office Re. U.S. Appl. No. 18/605,883. (41 Pages).

Official Action Dated Jan. 20, 2026 from the US Patent and Trademark Office Re. U.S. Appl. No. 18/605,883. (44 pages).

Notice of Allowance Dated Apr. 28, 2026 from the US Patent and Trademark Office Re. U.S. Appl. No. 18/605,883. (11 pages).

* cited by examiner

NITROX-MIXTURES PRODUCTION MACHINE AND RELATED OPERATING METHOD

CROSS-REFERENCE TO RELATED APPLICATIONS

This application claims the benefit of priority of Italian patent application nos. 102023000005010 filed on Mar. 16, 2023 and 102023000022266 filed on Oct. 24, 2023, the contents of which are incorporated by reference as if fully set forth herein in their entirety.

FIELD AND BACKGROUND OF THE INVENTION

The present invention relates to a Nitrox-mixtures production machine and to its operating method.

More specifically, the present invention relates to machine for producing breathing gaseous Nitrox mixtures to be fed into a high-pressure compressor for refilling diving cylinders.

Use to which the following disclosure will make explicit reference without thereby losing in generality.

As is well known, scuba diving cylinders are hermetically sealed vessels, substantially cylindrical in shape, that have a nominal capacity of generally less than 18-20 litres and are structured to contain breathing air with a nominal maximum pressure usually ranging between 200 and 300 bar.

Scuba diving cylinders are usually filled using special high-pressure compressors, which are structured so as to suck air at ambient pressure and to deliver a flow of suitably filtered and dehumidified air at the outlet, with a nominal pressure of more than 200-300 bar.

Clearly, scuba diving cylinders may also be filled with breathing mixtures other than simple air. More and more often, in fact, divers choose to breath gaseous mixtures in which the stoichiometric ratios between oxygen, nitrogen and any other gases are totally different from those typical of common breathing air.

Nitrox breathing mixtures, for example, differ from conventional air in that they contain a higher percentage of oxygen. In other words, Nitrox mixtures are binary gaseous mixtures consisting of Nitrogen and Oxygen, in which the percentage of Oxygen is more than 21%.

Among the best-known and most popular gaseous mixtures among divers there are the breathing Nitrox mixtures in which the oxygen content is equal to 32% or 36%. These particular breathing mixtures are called EAN-32 and EAN-36, where the suffix EAN stands for Enriched Air Nitrox.

Over the past few years, the use of EAN-32 and EAN-36 mixtures has grown intensely, thus there has been developed machines that are capable of producing, at relatively low costs, large amounts of Nitrox mixtures with an oxygen percentage of 32% and/or 36%, and are adapted to be placed upstream of conventional high-pressure compressors for refilling diving cylinders.

In other words, these machines are capable of feeding the EAN-32 or EAN-36 mixtures directly to the suction of the high-pressure compressor.

Currently, the most popular Nitrox-mixtures production machines on the market use a semi-permeable membrane molecular separator, which is capable to separate nitrogen from oxygen by exploiting the fact that nitrogen molecules are larger than oxygen molecules.

In more detail, the molecular separator consists of an oblong-shaped pressure vessel, which has one inlet and two separate outlets, and moreover accommodates within itself a bundle of very thin hollow fibres made of polymeric material, which forms the semi-permeable membrane.

The inlet of the pressure vessel is used to introduce, into the molecular separator, a flow of air with a pressure of approximately 8-10 bar, which is channeled directly into the various hollow fibres forming the semi-permeable membrane. Inside the hollow fibres, most of the molecules of oxygen, carbon dioxide and water vapour contained in the air flow are able to freely pass through the wall of the hollow fibre, and head towards the first outlet of the pressure vessel. Most of the nitrogen molecules contained in the air stream, on the other hand, remain confined within the hollow fibres and head towards the second outlet of the pressure vessel.

From the first outlet of the molecular separator, therefore, a gaseous mixture with a high percentage of oxygen and water vapour comes out. From the second outlet of the molecular separator, on the other hand, a gaseous mixture with a nitrogen percentage of more than 90 percent comes out.

Unfortunately, the currently known semi-permeable membrane molecular separators have a limited efficiency, so that from the first outlet of the molecular separator, it comes out a gaseous mixture with an oxygen percentage of usually ranging between 40% and 42%, to which is added a significant percentage of water vapour.

In addition to the molecular separator with a semi-permeable hollow-fibre membrane, the above mentioned Nitrox-mixtures production additionally include: a low-pressure compressor that feeds a flow of air with a pressure of 8-10 bar into the molecular separator; and an electric heater, which is placed between the low-pressure compressor and the molecular separator, and is adapted to heat up the flow of pressurised air directed towards the molecular separator in order to maximise the efficiency of the latter.

Since the Nitrox mixture coming out of the molecular separator has an oxygen percentage higher than that required for EAN-32 and EAN-36 mixtures, the Nitrox-mixtures production machines are additionally provided with a tubular mixing manifold, which is connected to the suction of the high-pressure compressor and is adapted to mix the gaseous mixture with a high oxygen content coming from the molecular separator with fresh air coming from the outside, so as to lower to the desired value the oxygen percentage of the Nitrox mixture directed towards the suction of the high-pressure compressor.

More specifically, the tubular mixing manifold is provided with an air inlet, which communicates directly with the outside through the interposition of an air filter and thus allows air to enter the tubular mixing manifold; with a Nitrox inlet, which communicates directly with the first outlet of the molecular separator so as to allow the gaseous mixture with a high oxygen content produced by the molecular separator to enter into the tubular mixing manifold; and with a Nitrox outlet, from which a Nitrox mixture with a lower oxygen content than that of the gaseous mixture produced by the molecular separator comes out.

The Nitrox outlet of the tubular mixing manifold is adapted to be connected directly to the suction of the high-pressure compressor.

Finally, Nitrox mixture production machines are provided with an oxygen sensor, which is located at the Nitrox outlet of the tubular mixing manifold and measures the percentage of oxygen present in the Nitrox mixture directed towards the suction mouth of the high-pressure compressor; and a small visualising device which is connected to the oxygen sensor and is able to show, in real time, the reading of the oxygen sensor.

Since the flowrate of the Nitrox mixture leaving the molecular separator is a fraction of the flowrate of the air fed into the same molecular separator, the oxygen percentage of the Nitrox mixture sucked in by the high-pressure compressor can be adjusted by appropriately varying the flowrate of the air flow that the low-pressure compressor feeds into the molecular separator.

In today's most efficient and performing Nitrox-mixtures production machines, the air is fed at inlet of the molecular separator via an electrically-driven volumetric screw compressor.

In these more efficient and performing machines, the flowrate delivered by the volumetric compressor is moreover regulated by a pressure-operated control valve, which is located at the suction mouth of the volumetric compressor, and is connected to the delivery of the same volumetric compressor via the interposition of a manually-operated pressure reducer, which is capable of varying the value of the air pressure returning to the control valve. By controlling the value of the air pressure arriving at the control valve, the pressure reducer is capable of varying the position of the shutter of the control valve and, thus, the flowrate of the compressor.

The person supervising the operation of the scuba-diving cylinders refilling equipment can therefore regulate the flowrate of air entering the molecular separator by manually acting on the pressure reducer.

Clearly, in order to maintain the oxygen percentage of the Nitrox mixture entering the high-pressure compressor at the desired value, the person supervising the operation of the scuba-diving cylinders refilling equipment must continuously check the values displayed by the display device and, when there are deviations from the desired value, correct the flowrate of the volumetric compressor by promptly acting on the pressure reducer of the volumetric compressor.

Since an incorrect composition of the Nitrox mixture can pose serious risks to the diver's safety, the Nitrox-mixtures production machines described above require the continuous presence of a person who monitors and promptly remedies the continuous variations of the oxygen percentage in the Nitrox mixture entering the high-pressure compressor.

In addition to the problem of continuous surveillance, unfortunately the above-described Nitrox-mixtures production machines moreover have a very unstable behaviour during transient states and take a long time to stabilise, with all the problems and wastes this entails.

Nitrox mixture that does not meet the diver's requirements (wrong oxygen percentage) cannot be sent to the suction of the high-pressure compressor at all and must be discharged externally.

The applicant has recently developed a Nitrox-mixtures production machine having an electronic control device, which implements a feedback control of the control valve based on signals arriving from the oxygen sensor located at the Nitrox outlet of the tubular mixing manifold.

The first working tests of this new Nitrox-mixtures production machine revealed that the behaviour of the volumetric compressor feeding the airflow at inlet of the molecular separator is rather unstable and strongly influenced by environmental variables, especially during the transient states that leads the machine to deliver the desired Nitrox mixture.

SUMMARY OF THE INVENTION

Aim of the present invention is to provide a control method that allows to minimize the instabilities of the volumetric compressor during the transients, so as to arrive more quickly to supply the desired Nitrox mixture.

In accordance with these aims, according to the present invention there is provided a Nitrox-mixtures production machine as defined in claim 1 and preferably, though not necessarily, in any of the claims dependent thereon.

Moreover, according to the present invention there is provided a operating method of a Nitrox-mixtures production machine as defined in claim 11 and preferably, though not necessarily, in any of the claims dependent thereon.

Finally, according to the present invention there is provided a scuba-diving cylinders refilling equipment as defined in claim 16.

BRIEF DESCRIPTION OF THE SEVERAL VIEWS OF THE DRAWINGS

The present invention will now be described with reference to the accompanying drawings, which show a non-limiting embodiment thereof, wherein:

FIG. 3 shows a block diagram concerning the operation of the Nitrox-mixtures production machine shown in FIG. 2; whereas

DESCRIPTION OF SPECIFIC EMBODIMENTS OF THE INVENTION

Figure 1:
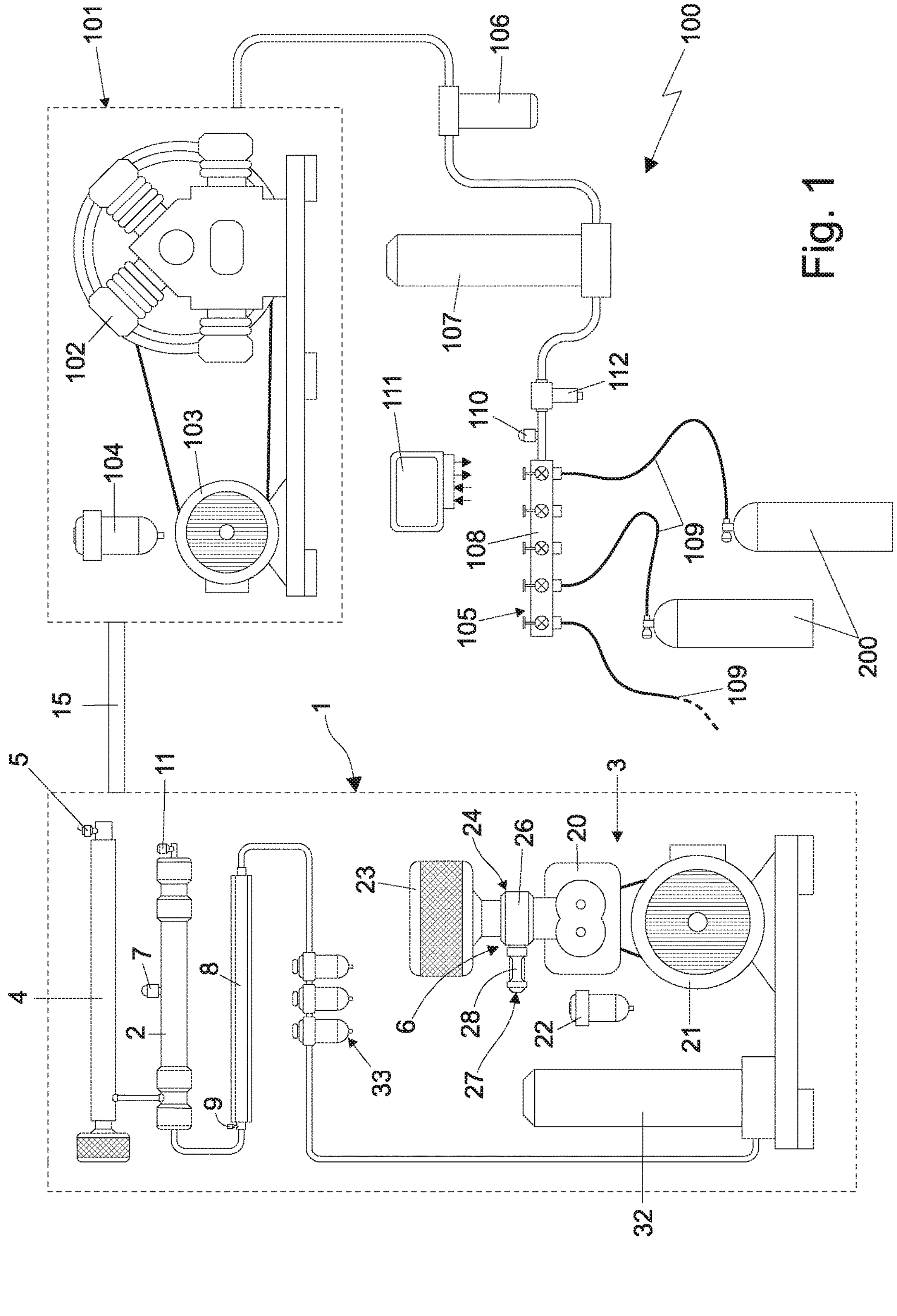
FIG. 1 illustrates, schematically and with parts removed for clarity's sake, a scuba diving cylinder filling equipment equipped with a Nitrox-mixtures production machine realized according to the teachings of the present invention.

With reference to FIG. 1, number 1 denotes as a whole a Nitrox-mixtures production machine, which capable of delivering a breathing gaseous mixture consisting mainly of oxygen and nitrogen, in which the oxygen percentage is greater than 21% and advantageously also less than 50%.

More specifically, the machine 1 is adapted to deliver a substantially binary nitrogen-oxygen gaseous mixture, in which the oxygen percentage is preferably less than 40% and advantageously equal to 32% or 36%.

The machine 1, in addition, is preferably adapted to be used in or incorporated into a scuba-diving cylinder refilling equipment 100, which is structured so as to fill up one or more scuba-diving cylinders 200 with a breathing gaseous mixture with a pressure preferably higher than 150 bar and advantageously also higher than 200 bar.

Scuba diving cylinders 200 are pressure vessels substantially cylindrical in shape, known and readily available on the market, so their structure won't be further described.

With reference to FIG. 1, on the other hand the scuba-diving cylinders refilling equipment 100 comprises at least one high-pressure compressor 101, which is specifically structured/dimensioned for sucking in air or any other gaseous mixture at ambient pressure, and for delivering at outlet a flow of high-pressure air or other gaseous mixture with a supply/delivery pressure preferably greater than 150 bar and advantageously also equal to or greater than 200 bar.

Preferably the high-pressure 101 compressor is moreover a positive displacement compressor.

The Nitrox-mixtures production machine 1, in turn, is preferably adapted to be placed upstream of the high-pressure compressor 101, so as to be able to feed, at inlet of the same high-pressure compressor 101, a Nitrox mixture with a predetermined composition.

In other words, the machine 1 is structured so as to be connected to the suction mouth of the high-pressure compressor 101, and is adapted to feed at inlet of the high-pressure compressor 101 a Nitrox gaseous mixture with a predetermined percentage of Oxygen and, consequently, of Nitrogen.

With reference to FIG. 1, in the example shown, the high-pressure compressor 101 is preferably a positive displacement reciprocating compressor with a multi-stage structure.

More in detail, the high-pressure compressor 101 preferably comprises: a piston pumping assembly 102 with a multistage structure, which has a series of variable-volume pumping chambers connected in cascade one after the other; an electric driving motor 103, which is mechanically coupled to the pumping assembly 102 so as to continuously cyclically vary the volume of the various variable-volume chambers; and preferably also a gas/liquid separator 104, which is located downstream of the piston pumping assembly 102 and is structured so as to retain within itself the droplets of oil and/or condensed water vapour present in the flow of high-pressure air or other gaseous mixture coming out of the pumping assembly 102.

Preferably the delivery of the high-pressure compressor 101 is therefore located downstream of the gas/liquid separator 104.

In addition, the pumping assembly 102 and the drive motor 103 are preferably arranged side by side to one another, advantageously resting on the same supporting platform or frame, so as to form an easily transportable single block. Also the gas/liquid separator 104 is preferably located on the same supporting platform or frame.

Preferably, the pumping assembly 102 and the drive motor 103 are moreover connected to each other by means of a drive belt, which is looped around two pulleys fixed one on the shaft of drive motor 103 and the other on the crankshaft of the pumping assembly 102.

Clearly, the drive motor 103 may be also an internal combustion engine.

Preferably, the high-pressure compressor 101 is moreover provided with a series of heat exchangers (not illustrated), which are located downstream of the various variable-volume chambers of the pumping assembly 102, and are structured so as to cool down the air or other gaseous mixture flowing from a corresponding variable-volume chamber to the next and/or leaving the pumping assembly 102.

With reference to FIG. 1, preferably the scuba-diving cylinders refilling equipment 100 furthermore comprises: a high-pressure gas distribution assembly 105, which communicates with the delivery of the high-pressure compressor 101 so to receive at inlet the flow of high-pressure air or other gaseous mixture produced by the high-pressure compressor 101, and is selectively connectable to one or more scuba diving cylinders 200 so as to be able to channel said flow of high-pressure air or other gaseous mixture to said cylinder (s) 200; and filtering assembly 106 preferably of the activated carbon type, which is located between the distribution assembly 105 and the delivery mouth of the high-pressure compressor 101, and more in detail between the gas/liquid separator 104 and the distribution assembly 105, and is structured so as to retain impurities and other physical and/or biological contaminants present in the flow of high-pressure air or other gaseous mixture flowing towards the distribution assembly 105.

Preferably, the scuba diving cylinders refilling equipment 100 moreover comprises a drying device 107 which is capable of retaining at least part of the water vapour present in the flow of high-pressure air or other gaseous mixture that flows towards the distribution assembly 105.

In the example shown, in particular, the drying device 107 is preferably an absorption dryer structured so as to reduce the amount of water vapour in the air leaving the high-pressure compressor 101 to a value less than or equal to 15 $mg/m^3$.

In addition, the distribution assembly 105 and/or the filtering assembly 106 and/or the dryer device 107 is/are preferably also located/fixed on the supporting platform or frame that supports the pumping assembly 102 and the drive motor 103.

Preferably, the high-pressure gas distribution assembly 105 in turn comprises: a distribution manifold 108, which communicates with the delivery of the high-pressure compressor 101 so as to receive the flow of high-pressure air or other gaseous mixture produced by the high-pressure compressor 101, and is provided with one or more manually-operated shut-off valves, separate and independent from each other, each of which is capable of regulating/controlling the exit of the high-pressure air or other gaseous mixture from the same manifold 108; and advantageously also one or more flexible connecting hoses 109, each of which is connected to the distribution manifold 108 so as to communicate with a single, respective shut-off valve of the distribution manifold 108, and is provided with a coupling connector specifically structured to be removably coupled to the valve of any scuba diving cylinder 200.

Preferably, the scuba-diving cylinders refilling equipment 100 moreover comprises: a pressure sensor 110, which is located immediately upstream of the distribution assembly 105, or rather upstream of the distribution manifold 108, and is structured to provide as output a (electrical) signal indicative of the pressure value of the high-pressure air or other gaseous mixture arriving in the distribution assembly 105; and an electronic control unit 111, which is connected to the pressure sensor 110 and is programmed/configured to switch off the high-pressure compressor 101, or rather switch off the drive motor 103, when the pressure value of the high-pressure air or other gaseous mixture arriving in the distribution assembly 105 reaches or exceeds a given limit value advantageously comprised between 200 and 300 bar.

Preferably, the scuba-diving cylinders refilling equipment 100 is finally also equipped with a normally-closed discharge valve 112, which is located immediately upstream of the distribution assembly 105, and more in detail between the dryer device 107 and the distribution assembly 105, and is structured so as to selectively divert/discharge directly outside the flow of high-pressure air or other gaseous mixture arriving from the high-pressure compressor 101, before it may reach the high-pressure gas distribution assembly 105.

Figure 2:
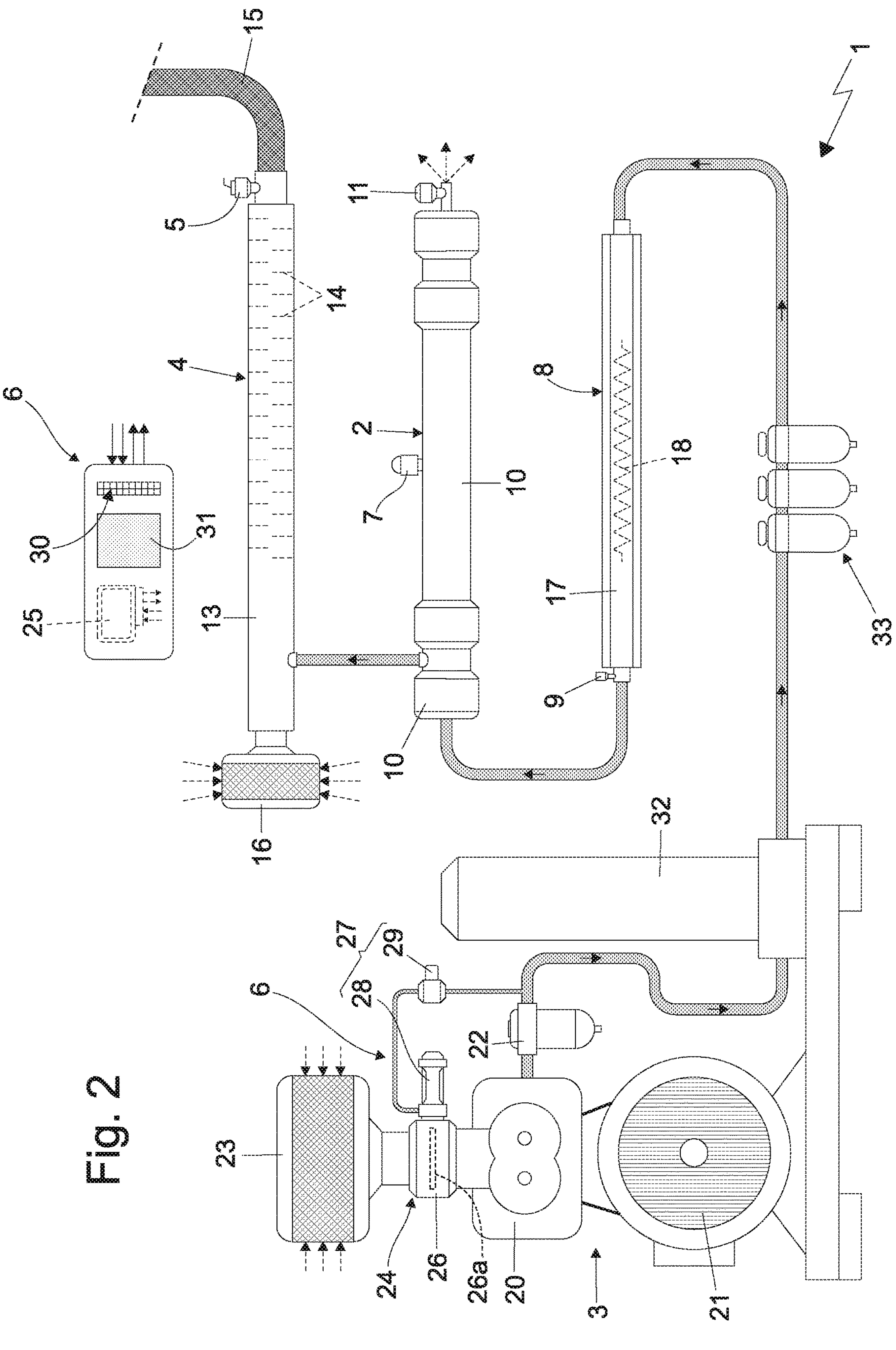
FIG. 2 is a schematic view of the Nitrox-mixtures production machine shown in FIG. 1.

With reference to FIGS. 1 and 2, the Nitrox-mixtures production machine 1 in turn comprises: a molecular separator 2, which is structured so as to receive at inlet a flow of air and supply at outlet an intermediate Nitrox mixture with a high percentage of oxygen; a low-pressure compressor 3, which is adapted to feed at inlet of the molecular separator 2 a flow of air with a predetermined nominal pressure preferably higher than 3 bar and/or lower than 20 bar; and a mixing manifold 4, which communicates with the molecular separator 2 so as to receive said intermediate Nitrox mixture, and is structured so as to mix the intermediate Nitrox mixture with fresh air from the outside, in order to provide at outlet a final Nitrox mixture having a predetermined composition.

Clearly, the oxygen percentage of the final Nitrox mixture is lower than or equal to the oxygen percentage of the intermediate Nitrox mixture.

Preferably, the outlet of the mixing manifold 4 is moreover structured so as to be connected or connectable directly to the suction mouth of the high-pressure compressor 101, in order to feed said final Nitrox mixture at inlet of the same high-pressure compressor 101.

Molecular Separator 2, on the other hand, is preferably a semi-permeable membrane molecular separator.

In addition, the Nitrox-mixtures production machine 1 moreover comprises: at least one oxygen sensor 5, which is capable of measuring the percentage of oxygen present in the Nitrox mixture exiting the mixing manifold 4, i.e. the oxygen percentage present in the Nitrox mixture; and an electronic control device 6, which is connected to the oxygen sensor (s) 5, and is adapted to regulate the flowrate of the air flow that the low-pressure compressor 3 feeds at inlet of the molecular separator 2, depending on the signals arriving from the oxygen sensor (s) 5.

More specifically, the or at least one of the oxygen sensors 5 is preferably located at the outlet of the mixing manifold 4 or immediately downstream of the mixing manifold 4, and is structured so as to provide as output a signal indicating the percentage of oxygen present in the Nitrox mixture directed towards the suction mouth of the high-pressure compressor 101.

The electronic control device 6, on the other hand, is adapted to regulate the flowrate of the airflow that the low-pressure compressor 3 feeds at inlet of the molecular separator 2, so as to automatically maintain at a predetermined target value, hereinafter referred to as the target percentage O $\%_0$, the oxygen percentage of the Nitrox mixture that comes out of the mixing manifold 4 and advantageously enters the suction mouth of the high-pressure compressor 101.

Preferably said target percentage O $\%_0$ is moreover manually selectable by the user among a predetermined range of values.

With particular reference to FIG. 2, furthermore the Nitrox-mixtures production machine 1 comprises also at least one pressure sensor 7, which is located in the molecular separator 2 and is structured so as to provide at output a (electrical) signal indicative of the value of the pressure of the air contained within the molecular separator 2.

The electronic control device 6, in turn, is connected also to the pressure sensor (s) 7, and is adapted to regulate the flowrate of the airflow that the low-pressure compressor 3 feeds at inlet of the molecular separator 2 also based on the signals coming from the pressure sensor or sensor 7.

In addition, the Nitrox-mixtures production machine 1 preferably also includes a preferably electrically-powered, heating device 8, which is interposed between the low-pressure compressor 3 and the molecular separator 2, and is adapted to heat up the airflow that the low-pressure compressor 3 feeds at inlet of the molecular separator 2.

The electronic control device 6, moreover, is preferably also adapted to command the heating device 8 advantageously so as to bring and maintain the temperature of the airflow entering the molecular separator 2 to a predetermined target value, hereinafter referred to as the target temperature $T_0$, which is advantageously comprised between +35° C. and +45° C.

More in detail, the Nitrox-mixtures production machine 1 is preferably also provided with at least one temperature sensor 9, which is located between the molecular separator 2 and the heating device 8, and is structured so as to provide as outlet a (electrical) signal indicative of the temperature of the air directed towards the molecular separator 2.

The electronic control device 6, in turn, is preferably connected to the temperature sensor (s) 9, and is preferably adapted to command the heating device 8 according to the signals arriving from the temperature sensor (s) 9, so as to bring the temperature of the airflow entering the molecular separator 2 to said target temperature $T_0$.

In addition, the electronic control device 6 is preferably also adapted to command the heating device 8 according to the signals arriving from the oxygen sensor (s) 5 and/or according to the signals arriving from the pressure sensor (s) 7.

More specifically, the electronic control device 6 is preferably also adapted to vary/modify the value of said target temperature $T_0$ according to the signals arriving from the oxygen sensor (s) 5 and/or according to the signals arriving from the pressure sensor (s) 7.

With reference to FIG. 2, in the example shown, in particular, the semi-permeable membrane molecular separator 2 is preferably structured so as to provide at outlet a Nitrox mixture with an oxygen percentage lower than 50% and advantageously ranging between 38% and 45%.

In addition, the molecular separator 2 preferably comprises: a pressure vessel 10 advantageously oblong in shape, which is preferably made of a metal or composite material, and is provided with an inlet and two outlets separate and distinct from each other; an automatic discharge valve 11, which is located at a first outlet of the pressure vessel 10 and is adapted to maintain the pressure of the gas inside the pressure vessel 10 more or less constant at a predetermined value advantageously lower than 20 bar; and a bundle of hollow fibres with a semi-permeable wall (not visible in the figures), which are arranged inside the pressure vessel 10 so as to connect the inlet of the vessel directly with the outlet of the vessel where the discharge valve 11 is located, and are made of a polymeric or composite material having a structure permeable to molecules of oxygen, water vapour, carbon dioxide and, more generally, to molecules with dimensions smaller than those of nitrogen molecules.

The pressure sensor (s) 7 is/are preferably mounted on the pressure vessel 10 so as to measure/detect the air pressure within the bundle of hollow fibres of the molecular separator 2.

The semi-permeable membrane molecular separator 2 and the pressure sensor (s) 7 are components readily available on the market, so they won't be further described.

The semi-permeable membrane molecular separator 2 operates as follows: while the air flow produced by the low-pressure compressor 3 enters the pressure vessel 10 and flows within the hollow fibres towards the discharge valve 11, most of the molecules of oxygen, carbon dioxide and/or water vapour contained in the air succeed in freely passing through the wall of the hollow fibres, and heads towards the second outlet of the pressure vessel 10. Instead, almost all of the nitrogen molecules contained in the air flowing within the hollow fibres remain confined within the hollow fibres and reach the first outlet of pressure vessel 10, from where they exit the pressure vessel 10 through the discharge valve 11.

From the first outlet of pressure vessel 10, therefore, a gaseous mixture is discharged into the atmosphere with a very high nitrogen percentage advantageously high than 90%.

From the second outlet of pressure vessel 10, instead, it comes out a Nitrox mixture with a high oxygen percentage, with the addition of a small percentage of water vapour and/or carbon dioxide.

More specifically, a Nitrox mixture with an oxygen percentage preferably ranging between 38% and 45% comes out of the second outlet of pressure vessel 10.

Mixing manifold 4, in turn, is preferably connected to the second outlet of pressure vessel 10 in order to receive said Nitrox mixture with the high oxygen percentage.

With particular reference to FIG. 2, the mixing manifold 4 preferably comprises: an oblong and advantageously also substantially rectilinear, tubular body 13, which is provided with an additional mouth spaced apart from the two main mouths located at the two opposite ends of the same tubular body 13; and advantageously also a series of deflecting fins or appendages 14, which are spread within the tubular body 13 and are adapted to create a strong turbulence in the gaseous mixture flowing within the tubular body 13.

The first end/mouth of the tubular body 13 communicates directly with the outside. The second end/mouth of the tubular body 13 is structured so as to be connected directly to the suction mouth of the high-pressure compressor 101, preferably by means of a removable connecting pipe 15.

The additional mouth of tubular body 13, on the other hand, communicates directly with the outlet of the molecular separator 2, or rather with the second outlet of the pressure vessel 10, so as to allow the Nitrox mixture with the high oxygen percentage to freely enter inside the same tubular body 13.

Preferably, the mixing manifold 4 additionally includes a filtering assembly 16, which is located at first end/mouth of tubular body 13, and is adapted to retain the dust suspended in the air entering the tubular body 13.

With particular reference to FIG. 2, in addition, the or at least one of the oxygen sensors 5 is preferably fixed on the tubular body 13 at or near the second end/mouth of tubular body 13.

Preferably, the or each oxygen sensor 5 moreover consists of an electrochemical oxygen cell of a known type, that provides at output an electrical signal indicative of the value of the oxygen percentage present in the gaseous mixture grazing the cell.

The heating device 8, on the other hand, preferably comprises: an oblong tubular body 17, which is preferably substantially rectilinear and/or made of metallic material, and is adapted to be crossed by the airflow directed towards the molecular separator 2; and a resistor 18, which is located within the tubular body 17 so as to be lapped and cooled by the airflow passing through the same oblong tubular body 17.

Preferably, the or at least one of the temperature sensors 9 is also located/mounted on tubular body 17, at the end/mouth from where the airflow exits the tubular body 17, directed towards the molecular separator 2.

With reference to FIGS. 1 and 2, on the other hand, the low-pressure compressor 3 is preferably structured so as to suck air at ambient pressure and feed the molecular separator 2 with an airflow with a pressure advantageously ranging between 8 and 15 bar.

In addition, the low-pressure compressor 3 is preferably a rotary volumetric compressor.

More specifically, the low-pressure compressor 3 is preferably a volumetric screw compressor.

In other words, the low-pressure compressor 3 preferably comprises: a screw pumping assembly 20; an electric drive motor 21, which is mechanically connected to the screw pumping unit 15 so as to drive into rotation the two rotors of the screw pumping assembly 20, advantageously with a predetermined and substantially constant rotation speed; and preferably also a gas/liquid separator 22, which is located downstream of the screw pumping assembly 20, and is structured to retain within itself the droplets of oil and/or condensed water vapour present in the airflow coming out from the pumping assembly 20.

In addition, the low-pressure compressor 3 is preferably also provided with a filtering assembly 23, which is located upstream of the screw pumping assembly 20, and is adapted to retain the dust suspended in the air being sucked in by the low-pressure compressor 3.

Preferably, the pumping assembly 20 and the drive motor 21 are moreover arranged side by side to each other, advantageously resting on the same supporting platform or frame, so as to form an easily transportable single block. Also the gas/liquid separator 22 and/or the filtering assembly 23 is/are advantageously located on the supporting platform or frame that hosts the pumping assembly 20 and the drive motor 21.

In addition, the screw pumping assembly 20 and the drive motor 21 are preferably connected to each other by means of a drive belt, which is looped around two pulleys fixed one to the shaft of the drive motor 21 and the other to the shaft of the screw pumping assembly 20.

Clearly, the drive motor 21 may drive into rotation the shaft of pumping assembly 20 without the use of belts and/or other intermediate motion transmission parts.

Preferably also the molecular separator 2 and/or the mixing manifold 4 and/or the electronic control device 6 and/or the heating device 8 is/are located on the supporting platform or frame that hosts the pumping assembly 20 and the drive motor 21, so as to form an easily transportable single block.

With particular reference to FIG. 2, the electronic control device 6, in turn, is adapted to regulate/vary the flowrate of the airflow that is sucked in by the low-pressure compressor 3, or rather by the screw pumping assembly 20, based on both the signals coming from the oxygen sensor (s) 5 and the signals coming from the pressure sensor (s) 7.

The electronic control device 6 in particular comprises: an electronically-controlled valve assembly 24, which is located upstream of the suction of the low-pressure compressor 3, or rather upstream of the suction mouth of the screw pumping assembly 20, so as to regulate/vary the flowrate of the airflow that is sucked in by the low-pressure compressor 3; and an electronic control unit 25, which is connected to the oxygen sensor (s) 5 and advantageously also to the pressure sensor (s) 7, and is adapted to command the valve assembly 24 based on the signals arriving from both the oxygen sensor (s) 5 and the pressure sensor (s) 7.

More in detail, the valve assembly 24 comprises: a control valve 26, which is located upstream of the suction of low-pressure compressor 3, or rather upstream of the suction mouth of the screw pumping assembly 20, and has a movable shutter 26*a* that regulates, according to its position inside the valve, the flowrate of the airflow that flows towards the suction mouth of the low-pressure compressor 3, advantageously between a maximum and a minimum value; and an electronically-controlled driving device 27, which is adapted to move/shift, on command, the movable shutter 26*a* of the same control valve 26.

The electronic control unit 25, in turn, is adapted to command the electronically-controlled driving device 27, so as to control, advantageously in real time, the position of the movable shutter 26*a* of control valve 26.

The electronic control unit 25, in turn, is adapted to command the electronically-controlled driving device 27, so as to control, advantageously in real time, the position of the movable shutter of control valve 26.

The electronic control unit 25, in addition, is programmed/configured so as to maintain the oxygen percentage in the Nitrox mixture flowing out of outlet of mixing manifold 4, or rather flowing out of the second end/mouth of tubular body 13, and is advantageously directed towards the suction of high-pressure compressor 101, substantially constant over time and substantially equal to said target percentage O %.

More in detail, the electronic control unit 25 is programmed/configured so as to continuously vary/correct the position of the movable shutter 26*a* of control valve 26 based on signals coming from the oxygen sensor(s) 5, so as to implement a feedback control of the valve assembly 24.

In other words, the electronic control unit 25 is programmed/configured to implement a feedback control of the position of the movable shutter 26*a* of the control valve 26 based on signals coming from the oxygen sensor(s) 5.

In addition, the electronic control unit 25 is programmed/configured to implement a feedback control of the position of the movable shutter of command valve 26 when the air pressure inside the molecular separator 2 meets certain conditions.

Clearly, the air pressure inside the molecular separator 2 is measured with the aid of the pressure sensor (s) 7.

With reference to FIG. 2, in particular, the driving device 27 preferably comprises: a pneumatic actuator 28, which is adapted to varying the position of the movable shutter 26*a* of the control valve 26 according to the value of the air pressure that the same actuator receives at its inlet; and an electronically-controlled pressure reducer 29, which is interposed between the pneumatic actuator 28 and the delivery of the low-pressure compressor 3, and is adapted to adjust/vary, on command, the value of the air pressure directed towards the inlet of the pneumatic actuator 28.

In other words, the pneumatic actuator 28 is coupled to, or incorporated into, the control valve 26 so as to freely move/displace the movable shutter 26*a* of the control valve 26, and the pressure of the air that the pneumatic actuator 28 receives at inlet determines the position assumed by the movable shutter of the valve.

Thus, the pressure of the air that the pressure reducer 29 feeds at inlet of the pneumatic actuator 28 determines the position of the movable shutter 26*a* of the control valve 26.

The electronic control unit 25, in turn, is preferably adapted to control the pressure reducer 29 so as to feed, at inlet to the pneumatic actuator 28, a flow of pressurised air having a pressure set by the same electronic control unit 25.

In the example shown, in particular, the control valve 26 is preferably a butterfly valve or gate valve, and is preferably interposed between the filtering assembly 23 and the suction mouth of the screw pumping assembly 20.

The control valve 26, in addition, is advantageously structured so as to regulate/vary the flowrate of the airflow entering the low-pressure compressor 3 between zero and a predetermined maximum value.

The pneumatic actuator 28, in turn, is preferably a single-acting pneumatic cylinder, which is advantageously incorporated within the control valve 26, and is adapted to move the movable shutter 26*a* of the control valve 26 preferably by overcoming the force of a counter spring that instead tends to bring and maintain the movable shutter 26*a* in a closed position.

With reference to FIG. 2, the electronic control device 6 is moreover provided with an external control panel 30 or other type of user interface, via which the user can communicate to the electronic control unit 25 the oxygen percentage of the Nitrox mixture that has to come out from the mixing manifold 4 and advantageously reach the suction of the high-pressure compressor 101; and preferably also with a display or other external visualising device 31, which is commanded by the electronic control unit 25 and is capable of displaying the oxygen percentage momentarily set as target percentage O $\%_0$ by the user.

Preferably, the visualising device 31 is moreover capable of displaying, advantageously in real time, the value detected by the oxygen sensor (s) 5 and/or the value detected by the pressure sensor (s) 7.

In the example shown, in particular, the electronic control unit 25 and/or the control panel 30 and/or the visualising device 31 are advantageously located within a rigid boxlike enclosure of known type.

Preferably, the electronic control unit 25 is moreover connected also to the temperature sensor (s) 9, and is advantageously also adapted to command the heating device 8 based on the signals arriving from the temperature sensor (s) 9 and optionally also based on the signals arriving from the oxygen sensor (s) 5.

More in detail, the electronic control unit 25 is preferably programmed/configured so as to independently establishes the target temperature $T_0$ that the airflow entering the molecular separator 2 must have advantageously choosing it among a predetermined range of values, and then it is adapted to activate and deactivate the heating device 8 so as to heat the airflow directed towards the molecular separator 2 up to this target temperature $T_0$.

In other words, the electronic control unit 25 is preferably programmed/configured to command the electric current circulating in the resistor 18 of heating device 8.

Preferably, the visualising device 31 is moreover capable of displaying, advantageously in real time, the value measured by said temperature sensor (s) 9.

In a less sophisticated embodiment, however, the electronic control unit 25 may be programmed/configured to activate and deactivate the heating device 8 in order to heat the airflow headed towards the molecular separator 2 up to a preset and non-adjustable target temperature $T_0$, advantageously ranging between +35° C. and +45° C.

Preferably, the electronic control unit 25 of the electronic control device 6 is finally also adapted to open the discharge valve 112 if the composition of the Nitrox mixture coming out of mixing manifold 4 does not correspond to the set composition.

With reference to FIGS. 1 and 2, preferably the Nitrox-mixtures production machine 1 additionally comprises, upstream of the molecular separator 2 or the heating device 8, a drying device 32 and/or a filtering assembly 33.

The drying device 32 is adapted to retain at least part of the water vapour present in the airflow coming out of the low-pressure compressor 3, or rather coming out of the screw pumping assembly 20, and is preferably located immediately downstream of the gas/liquid separator 22 or the screw pumping assembly 20.

In the example shown, the drying device 32 is preferably an absorption dryer structured to reduce the amount of water vapour in the air leaving the low-pressure compressor 3 to a value less than or equal to 15 mg/$m^3$.

The filtering assembly 33, on the other hand, is preferably located between the drying device 32 and the molecular separator 2, or the heating device 8, and is structured so as to retain impurities and other physical and/or biological contaminants present in the airflow directed towards the molecular separator 2.

In the example shown, the filtering assembly 33 is preferably made up of a series of activated carbon filters arranged in cascade one to the other.

Preferably also the drying device 32 and/or a filtering assembly 33 is/are located on the supporting platform or frame that hosts the pumping assembly 20 and the drive motor 21, so as to form an easily transportable single block.

General operation of the scuba-diving cylinders refilling equipment 100 and of its high-pressure compressor 101 are already known in the market and therefore need no further explanation.

As regard instead the Nitrox-mixtures production machine 1, the electronic control unit 25 of electronic control device 6 is programmed/configured so as to carry out a feedback control of the valve assembly 24, or rather of the position of the movable shutter 26*a* of the control valve 26 of valve assembly 24, based on the signals arriving from the oxygen sensor(s) 5.

Clearly, the electronic control unit 25 varies/modifies the position of the movable shutter 26*a* of control valve 26 suitably commanding the electronically-controlled driving device 27 of valve assembly 24, or rather the pressure regulator 29.

In other words, the electronic control unit 25 is programmed/configured to continuously modify/adjust the position of the movable shutter 26*a* of control valve 26 based on the signals from the oxygen sensor(s) 5, so as to bring and maintain the oxygen percentage of the Nitrox mixture coming out of mixing manifold 4 to a value substantially equal to the target percentage O $\%_0$ set by the user.

By varying the flowrate of the airflow entering the low-pressure compressor 3, in fact, the electronic control unit 25 also varies the flowrate of the airflow entering the molecular separator 2 and, consequently, the flowrate of the flow of intermediate Nitrox mixture entering the mixing manifold 4. Each change in the flowrate of the Nitrox mixture entering into the mixing manifold 4, in turn, results in a change of the oxygen percentage of the Nitrox mixture that comes out of mixing manifold 4 and is sucked in by the high-pressure compressor 101.

In addition, the electronic control unit 25 is moreover programmed/configured so as to carry out the feedback control of the valve assembly 24 when the trend over time of the pressure of the air inside the molecular separator 2 has substantially stabilized over time.

In other words, the electronic control unit 25 is programmed/configured to monitor the air pressure inside the molecular separator 2, and to implement the feedback control of the valve assembly 24, or rather of the pressure reducer 29, when the trend over time of the air pressure inside the molecular separator 2 meets a stable-pressure condition, which is indicative of the fact that the air pressure inside the molecular separator 2 has substantially stabilised over time.

More in detail, the electronic control unit 25 is preferably programmed/configured to start the feedback control of the valve assembly 24, when the variations over time of the air-pressure value inside the molecular separator 2 remain within a predetermined tolerance range.

Preferably, the electronic control unit 25 is moreover programmed/configured to start the feedback control of the valve assembly 24, when the relative pressure (difference between the absolute pressure and the ambient pressure) of the air inside the molecular separator 2 has exceeded a predetermined minimum threshold.

Advantageously, this minimum threshold is furthermore greater than or equal to 0.8 bar.

More specifically, the electronic control unit 25 is preferably programmed/configured so as to start the feedback control of valve assembly 24, when variations (in absolute value) in the value of the air pressure inside the molecular separator 2 remain below a predetermined maximum threshold advantageously equal to or less than 0.5 bar, for a monitoring time interval greater than 2 s (seconds) and advantageously also lower than 60 s (seconds).

In other words, the stable-pressure condition is met when the variations (in absolute value) of the air-pressure value inside the molecular separator 2 remain below a predetermined maximum threshold advantageously equal to or less than 0.5 bar, for a monitoring time interval of more than 2 s (seconds) and advantageously also less than 60 s (seconds). In addition, the stable-pressure condition is preferably met when the relative air pressure inside the molecular separator 2 is greater than or equal to 0.8 bar.

More conveniently, this maximum threshold is preferably equal to 0.3 bar or, more advantageously, equal to 0.2 bar. The monitoring time interval, on the other hand, is preferably greater than or equal to 5 s (seconds) and/or less than or equal to 30 s (seconds) or, more advantageously, less than or equal to 20 s (seconds).

Even more conveniently, the stable-pressure condition is preferably met if variations (in absolute value) of the air-pressure value inside the molecular separator 2 remain below a maximum threshold of approximately 0.1-0.15 bar, at either end of a monitor time interval of approximately 10-15 s (seconds).

In addition, the stable-pressure condition is preferably met when the relative air pressure inside the molecular separator 2 is greater than or equal to 1 bar.

Preferably, the electronic control unit 25 is moreover programmed/configured so as to end the feedback control of the valve assembly 24, or rather of the pressure reducer 29, and advantageously also to close the valve assembly 24, upon the occurrence of one or more predetermined operational events.

More in detail, the electronic control unit 25 is preferably programmed/configured so as to end the feedback control of the valve assembly 24, and advantageously also to close the valve assembly 24, when a new and different value of the target percentage O $\%_0$ is set via the control panel 30, and/or when a stop signal is received advantageously coming from the control panel 30 (stop of machine 1 decided unilaterally by the user) and/or from the electronic control unit 111 (shutdown of the high-pressure compressor 101).

Assuming that the user has already selected the oxygen percentage of the Nitrox mixture that has to come out of the mixing manifold 4, i.e. has already selected the desired target O $\%_0$, the operation of the electronic control device 6 firstly entails:

- a step of pressure monitoring, in which the air pressure inside the molecular separator 2 is monitored, so as to determine when the trend over time of the air pressure in the molecular separator 2 has stabilised over time, i.e. meets said stable-pressure condition; and
- a subsequent step of feedback control, in which the position of the movable shutter 26*a* of control valve 26 is continuously adjusted/varied based on the signals coming from the oxygen sensor(s) 5, so as to bring and maintain the oxygen percentage of the Nitrox mixture coming out of the mixing manifold 4 at a value substantially equal to the target percentage O $\%_0$ set by the user.

Preferably, the feedback-control step starts after the trend over time of the air pressure in molecular separator 2 has stabilised over time, i.e. after said stable-pressure condition has been met.

In addition, beforehand the pressure-monitoring step, operation of the electronic control device 6 preferably also includes the step of determining an optimal initial position of the movable shutter 26*a* of control valve 26.

The optimal initial position is the position that the movable shutter 26*a* of control valve 26 should likely assume, on the basis of previous operating cycles, such that the machine 1 can deliver a Nitrox mixture having an oxygen percentage substantially equal to the target percentage O $\%_0$ set by the user.

Preferably, the step of determining the optimal initial position of the movable shutter 26*a* of control valve 26 in particular involves estimating, advantageously by means of linear interpolation, said optimal initial position on the basis of a plurality of already known sample positions, which are advantageously associated to Nitrox mixtures with specific oxygen percentages.

Finally, operation of electronic control device 6 preferably includes, at the end of the feedback-control step, a step of verification and possible updating of the sample position or positions based on the parameters used in the feedback-control step that has just ended.

Figure 3:
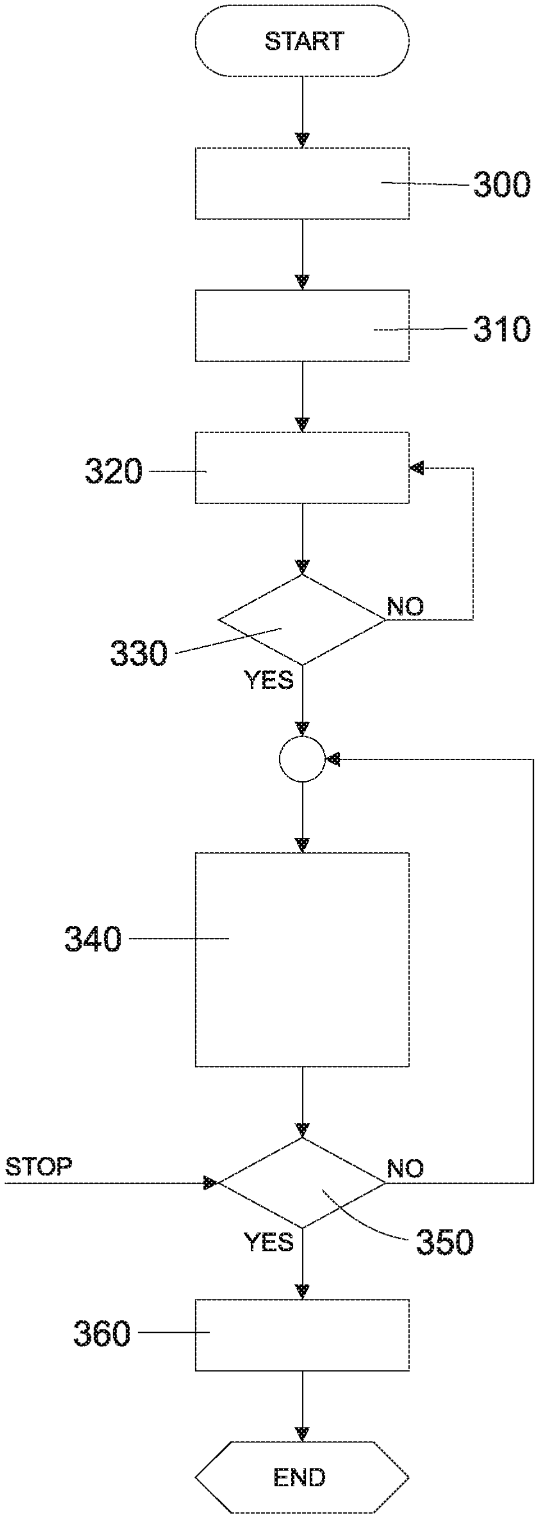

With reference to FIG. 3, in particular, the electronic control unit 25 preferably starts by determining (block 300) the optimal initial position that the movable shutter 26*a* of the control valve 26 should assume, so that the machine 1 can likely provided at outlet a Nitrox mixture having an oxygen percentage substantially equal to the target O $\%_0$ set by the user.

More in detail, the electronic control unit 25 is preferably programmed/configured to estimate the optimal initial position of the movable shutter 26*a* of valve assembly 26 by interpolating this initial optimum position from a series of already known sample positions.

In other words, the electronic control unit 25 preferably has a non-volatile memory in which are stored the sample positions that the movable shutter 26*a* of control valve 26 should assume in order to obtain at least two different values of target percentage O $\%_0$, and is preferably programmed/configured so as to determine the new optimal initial position of the movable shutter 26*a* of control valve 26 via interpolation based on said sample positions.

For example, the sample positions could be the position of the mobile shutter 26*a* of control valve 26 associated to a Nitrox gaseous mixture with an oxygen percentage equal to 28% (EAN-28), and the position of the mobile shutter 26*a* of control valve 26 associated to a Nitrox gaseous mixture with an oxygen percentage equal to 36% (EAN-36).

After having determined the optimal initial position of the movable shutter 26*a* of control valve 26, the electronic control unit 25 drives (block 310) the valve assembly 24, or rather the electronically-controlled driving device 27, so as to place the movable shutter 26*a* of control valve 26 in said optimal initial position.

After having placed the movable shutter 26*a* of control valve 26 in said optimal initial position, the electronic control unit 25 monitors (block 320) the value of the air pressure inside the molecular separator 2, and checks (block 330) whether the trend over time of the air pressure inside the molecular separator 2 has stabilised over time, i.e. whether it meets said set of stable-pressure conditions.

Clearly, the monitoring of the air pressure inside the molecular separator 2 is carried out with the aid of the pressure sensor (s) 7.

When the pressure of the air inside the molecular separator 2 has stabilised, the electronic control unit 25 starts the feedback control (block 340) of the valve assembly 24 based on signals coming from the oxygen sensor (s) 5.

In other words, when the pressure of the air inside the molecular separator 2 has stabilised, the electronic control unit 25 continuously modifies/adjusts the position of the movable shutter 26*a* of control valve 26 based on the signals coming from the oxygen sensor(s) 5, so as to bring and maintain the oxygen percentage of the Nitrox mixture coming out of mixing manifold 4 at a value substantially equal to the target percentage O $\%_0$ set by the user.

In addition, the electronic control unit 25 preferably ends (block 350) the feedback control of the valve assembly 24 when a predefined stop condition occurs.

Preferably, this stop condition includes the setting of a new and different value of the target percentage O $\%_0$ via the control panel 30, and/or the reception by the electronic control unit 25 of a stop signal that advantageously comes from the control panel 30 and/or the electronic control unit 111.

Preferably, after having ended the feedback-control step of valve assembly 24, the electronic control unit 25 finally compares (block 360) the sample position stored internally with the actual position assumed by the movable shutter 26*a* of control valve 26 during, or at the end of, the feedback operation cycle just completed and, if necessary, takes this actual position as a new sample position.

More in detail, the electronic control unit 25 preferably updates the sample position when the difference between the sample position stored internally and the actual position assumed by the movable shutter of control valve 26 during, or at the end of, the last feedback operation cycle exceeds a preset maximum threshold which is advantageously equal to 10-15%.

In the example shown, in particular, since the position of the movable shutter of control valve 26 is preferably controlled by the pneumatic actuator 28 on the basis of the pressure of the that the pressure reducer 29 feeds at inlet of pneumatic actuator 28, the electronic control unit 25 operates as follows.

Firstly, the electronic control unit 25 is preferably programmed/configured to determine (block 300) the value of the optimal initial pressure Pi that should be sent to the pneumatic actuator 28 of valve assembly 24, so that the machine 1 can reasonably provide at outlet of a Nitrox mixture having an oxygen percentage substantially equal to the target percentage O $\%_0$ set by the user.

More specifically, the electronic control unit 25 is preferably programmed/configured to estimate the value of said optimal initial pressure Pi on the basis of a plurality of sample pressures, advantageously stored within the same electronic control unit 25.

More specifically, the electronic control unit 25 is preferably programmed/configured to calculate/find the value of the optimal initial pressure Pi by interpolation, based on said plurality of already known sample pressures.

In other words, within the non-volatile memory of electronic control unit 25 there are advantageously stored the nominal pressure values (sample pressures), which the air at inlet of pneumatic actuator 28 must have in order to obtain at least two different values of target percentage O $\%_0$, and the electronic control unit 25 is preferably programmed/configured to determine said optimal initial pressure Pi by advantageously linear interpolation, based on said nominal pressure values (sample pressures).

In the example shown, in particular, within the non-volatile memory of electronic control unit 25 there are preferably stored the nominal value of the air pressure (sample pressure) to be fed at inlet of pneumatic actuator 28 for obtaining a Nitrox gaseous mixture with oxygen percentage equal to 28% (EAN-28), for example 1, 25 bar; and the nominal value of the air pressure (sample pressure) to be fed at inlet of pneumatic actuator 28 for obtaining a Nitrox gaseous mixture with oxygen percentage equal to 36% (EAN-36), for example 1.1 bar.

After having determined the value of the optimal initial pressure Pi that the air at inlet of the pneumatic actuator 28 must the electronic control unit 25 is preferably programmed/configured to drive (block 310) the pressure reducer 29 so that the pneumatic actuator 28 receives at its inlet an airflow having a pressure value equal to said optimal initial pressure $P_i$.

After having driven the pressure reducer 29 so that the pneumatic actuator 28 receives at inlet a flow of air with a pressure equal to said optimal initial pressure $P_i$, the electronic control unit 25 is preferably programmed/configured to determine (block 320) the momentary pressure of the air inside the molecular separator 2, advantageously based on the signals coming from the pressure sensor (s) 7.

After having determined the air pressure inside the molecular separator 2, the electronic control unit 25 is preferably programmed/configured to analyse (block 330) the trend over time of the air pressure in the molecular separator 2, so as to determine whether the trend of the air pressure in the molecular separator 2 has stabilised over time.

In other words, the electronic control unit 25 is preferably programmed/configured to check (block 330) when the trend over time of the air pressure inside the molecular separator 2 meets said stable-pressure condition.

After having determined that the trend over time of the air pressure present inside the molecular separator 2 has stabilized, i.e. meets said stable-pressure condition, the electronic control unit 25 is preferably programmed/configured so as to continuously modify/adjust (block 340) the pressure of the air that the pressure reducer 29 feeds at inlet of pneumatic actuator 28 based on the signals coming from the oxygen sensor (s) 5, i.e. carries out the feedback control, so as to bring and maintain the oxygen percentage of the Nitrox mixture coming out of mixing manifold 4 to a value substantially equal to the target percentage O $\%_0$ set by the user.

Preferably, the electronic control unit 25 is moreover programmed/configured to reset (block 350) the value of the air pressure that the pressure reducer 29 feed at inlet of pneumatic actuator 28 and to end the feedback control of the pressure reducer 29, when said stop condition occurs.

Finally, once the feedback control of the pressure reducer 29 of valve assembly 24 is ended, the electronic control unit 25 is preferably also programmed/configured so as to update (block 360) the sample pressure stored internally when the difference between the sample pressure stored internally and the air pressure fed to the pneumatic actuator 28 during the last feedback operation cycle is advantageously equal to or greater than 20%.

The advantages connected to the new Nitrox-mixtures production machine 1 and to its operating method are remarkable.

The Nitrox-mixtures production machine 1 does not require continuous supervision by the user and, in addition, is also capable of discharging externally the produced Nitrox mixture if its composition does not correspond to that set by the user.

In addition, the particular operating method implemented by the electronic control unit 25, which carries out the feedback control of valve assembly 24 only when the air pressure inside the molecular separator 2 has stabilised, makes it possible to minimise the duration of the transients in which the oxygen percentage of the Nitrox mixture coming out of mixing manifold 4 does not correspond to that set by the user, thus reducing the amount of Nitrox mixture that is discharged externally from the scuba-diving cylinders refilling equipment 100.

Finally, it is clear that modifications and variations may be made to the Nitrox-mixtures production machine 1 and/or the scuba diving cylinder refilling equipment 100 without however departing from the scope of the present invention.

For example, the low-pressure compressor 3 may be a lobe-type volumetric compressor.

In addition, the automatic discharge valve 11 of molecular separator 2 may be replaced by a simple pressure reducer and/or flow reducer.

The pneumatic actuator 28 of electronically-controlled valve assembly 24, moreover, could also be supplied with pressurised air coming from a source of pressurised air or other pressurised gas other than the low-pressure compressor 3.

In this case, the pressure reducer 29 would be interposed between the pneumatic actuator 28 and said pressurised-air source.

Figure 4:
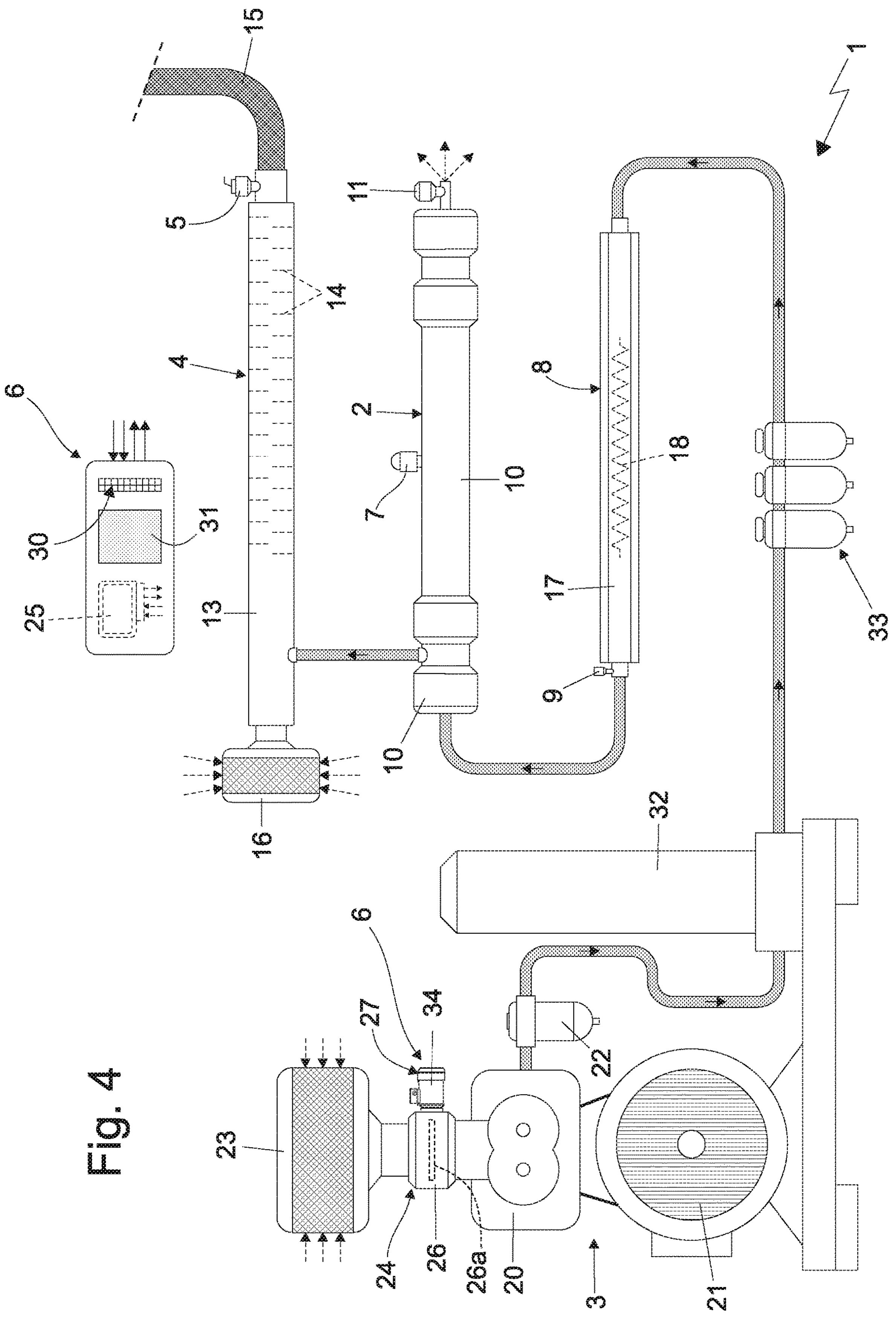
FIG. 4 is a schematic view of a different embodiment of Nitrox-mixtures production machine shown in FIG. 2.

With reference to FIG. 4, finally, in a more sophisticated embodiment, the electronically-controlled driving device 27 of valve assembly 24 comprises, in place of the pneumatic actuator 28 and the pressure reducer 29, an electronically-controlled electric or electromechanical actuator 34, which is advantageously provided with a position transducer, and is coupled to the control valve 26 so as to move/displace, on command, the movable shutter 26*a* of the same valve.

In this case, the electronic control unit 25 directly controls the electric or electromechanical actuator 34.

Clearly, also in this embodiment the electronic control unit 25 implements the feedback control of the valve assembly 24, or rather the feedback control of the electric or electromechanical actuator 34, when the air pressure inside the molecular separator 2 has stabilised.

The invention claimed is:

1. A nitrox-mixtures production machine, comprising:

a molecular separator, which is configured to receive at an inlet an airflow and to provide at an outlet an intermediate Nitrox mixture with high oxygen percentage;

a low-pressure compressor—, which is configured to supply an airflow at an inlet of the molecular separator;

a control valve—which is located upstream of the low-pressure compressor—and is configured to regulate the flowrate of the airflow at an inlet of said low-pressure compressor;

a mixing manifold-configured to communicate with the molecular separator for receiving said intermediate Nitrox mixture, and is configured to mix the intermediate Nitrox mixture with fresh air coming from outside, in order to provide at an outlet a final Nitrox mixture with predefined composition; and at least one oxygen sensor that outputs a signal indicative of the percentage of oxygen present in said final Nitrox mixture;

wherein said nitrox-mixtures production machine-additionally comprises:

at least one pressure sensor—that outputs a signal indicative of the pressure of the air inside the molecular separator;

an electronically-controlled driving device which is configured to move, on command, a movable shutter of said control valve for varying a flow rate of the airflow sucked by the low-pressure compressor-; and an electronic control unit, which is connected to said at least one oxygen sensor and to said at least one pressure sensor, and is configured to command said electronically-controlled driving device as a function of the signals coming from said at least one oxygen sensor—and from said at least one pressure sensor.

2. The nitrox-mixtures production machine according to claim 1, wherein said electronic control unit—is configured to vary a position of the movable shutter of the control valve—implementing a feedback control based on the signals coming from said at least one oxygen sensor.

3. The nitrox-mixtures production machine according to claim 2, wherein said electronic control unit is configured to actuate said feedback control based on the signals coming from said at least one oxygen sensor, when the trend of the air pressure inside the molecular separator meets a given stable-pressure condition indicative of a trend stable over time of the air pressure inside said molecular separator.

4. The nitrox-mixtures production machine according to claim 3, wherein said stable-pressure condition is met when the variations over time of a value of the air pressure inside said molecular separator remain within a predetermined tolerance range.

5. The nitrox-mixtures production machine according to claim 4, wherein said stable-pressure condition is met when the variations of the value of the air pressure inside the molecular separator remain below a predetermined maximum threshold, for a monitoring time interval greater than 2 seconds.

6. The nitrox-mixtures production machine according to claim 5, wherein said preset maximum threshold is equal to or lower than 0.5 bar and/or said monitoring time interval is also lower than 20 or 30 seconds.

7. The nitrox-mixtures production machine according to claim 3, wherein said stable-pressure condition is met when the relative pressure of the air inside said molecular separator—is greater than a predetermined minimum threshold.

8. The nitrox-mixtures production machine according to claim 1, wherein the electronically-controlled driving device comprises:

a pneumatic actuator—which is configured to vary a position of the movable shutter of the control valve—as a function of the value of a air pressure that said actuator receives at inlet; and an electronically-controlled pressure reducer, which is interposed between the pneumatic actuator—and a pressurized gas source, and is configured to regulate, on command, a value of the pressure of the gas directed towards the inlet of the pneumatic actuator.

9. The nitrox-mixtures production machine according to claim 8, wherein said electronic control unit—commands said electronically-controlled pressure reducer.

10. The nitrox-mixtures production machine according to claim 1, wherein said mixing manifold—is configured to be connected to the suction of a high-pressure compressor—in order to supply said final Nitrox mixture at an inlet of said high-pressure compressor.

11. Scuba-diving cylinders refilling equipment, comprising:

a high-pressure compressor-configured to suck in air or other gaseous mixture at ambient pressure and to provide at an outlet a flow of high-pressure air or other gaseous mixture to be supplied at an inlet of one or more scuba diving cylinders; and a nitrox-mixtures production machine—which is located upstream of said high-pressure compressor—and is configured to supply a Nitrox mixture with a predefined composition at the inlet of said high-pressure compressor;

wherein said nitrox-mixtures production machine is realized according to claim 1.

12. An operating method of a nitrox-mixtures production machine that comprises:

a molecular separator, which is configured to receive at an inlet an airflow and to provide at an outlet an intermediate Nitrox mixture with high oxygen percentage;

a low-pressure compressor-, which is configured to supply an airflow at the inlet of the molecular separator;

a mixing manifold-configured to communicate with the molecular separator—for receiving said intermediate Nitrox mixture, and is configured to mix the intermediate Nitrox mixture with fresh air coming from outside, in order to provide at outlet a final Nitrox mixture with predefined composition;

at least one oxygen sensor—that outputs a signal indicative of the percentage of oxygen present in said final Nitrox mixture; and a control valve which is located upstream of the low-pressure compressor and is configured to regulate a flow rate of the airflow at inlet of said low-pressure compressor;

wherein the operating method comprises:

a step of pressure monitoring, wherein the pressure of the air inside said molecular separator—is monitored to determine when the trend of the air pressure in the molecular separator—meets a given stable-pressure condition that is indicative of a trend stable over time of the air pressure inside said molecular separator; and a subsequent step of feedback control, wherein a position of a movable shutter of the control valve—is varied as a function of the signals coming from said at least one oxygen sensor.

13. The operating method of a nitrox-mixtures production machine according to claim 12, further comprising, before said step of pressure monitoring, a step of determining an optimal initial position of the movable shutter of the control valve.

14. The operating method of a nitrox-mixtures production machine according to claim 13, wherein the step of determining the optimal initial position of the movable shutter of the control valve-includes estimating said optimal initial position based on a number of known sample positions.

15. The operating method of a nitrox-mixtures production machine according to claim 12, further comprising, after said step of feedback control, a further step of checking and, if necessary, updating said known sample position or positions.

16. The operating method of a nitrox-mixtures production machine according to claim 12, wherein the position of the movable shutter of the control valve—is controlled by a pneumatic actuator—, and the step of feedback control includes varying a pressure of air supplied at an inlet of said pneumatic actuator.

17. The operating method of a nitrox-mixtures production machine according to claim 12, wherein said stable-pressure condition is met when the variations over time of the value of the air pressure inside said molecular separator remain within a predetermined tolerance range.

18. Scuba-diving cylinders refilling equipment, comprising:

a high-pressure compressor—configured to suck in air or other gaseous mixture at ambient pressure and to provide at an outlet a flow of high-pressure air or other gaseous mixture to be supplied at an inlet of one or more scuba diving cylinders; and a nitrox-mixtures production machine-which is located upstream of said high-pressure compressor and is configured to supply a Nitrox mixture with a predefined composition at the inlet of said high-pressure compressor;

wherein said nitrox-mixtures production machine operates according to claim 12.

* * * * *